United States Patent Office 3,387,726
Patented June 11, 1968

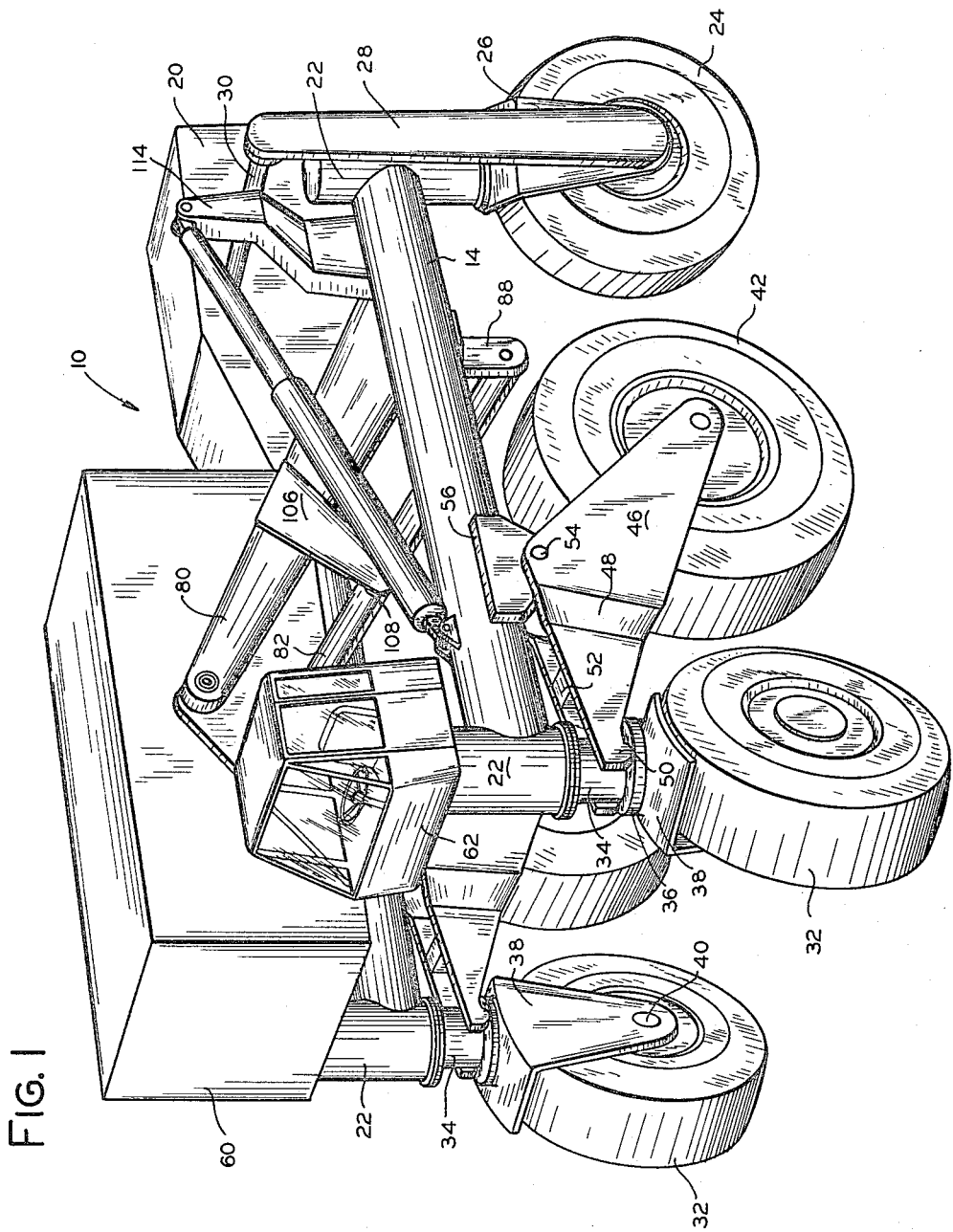

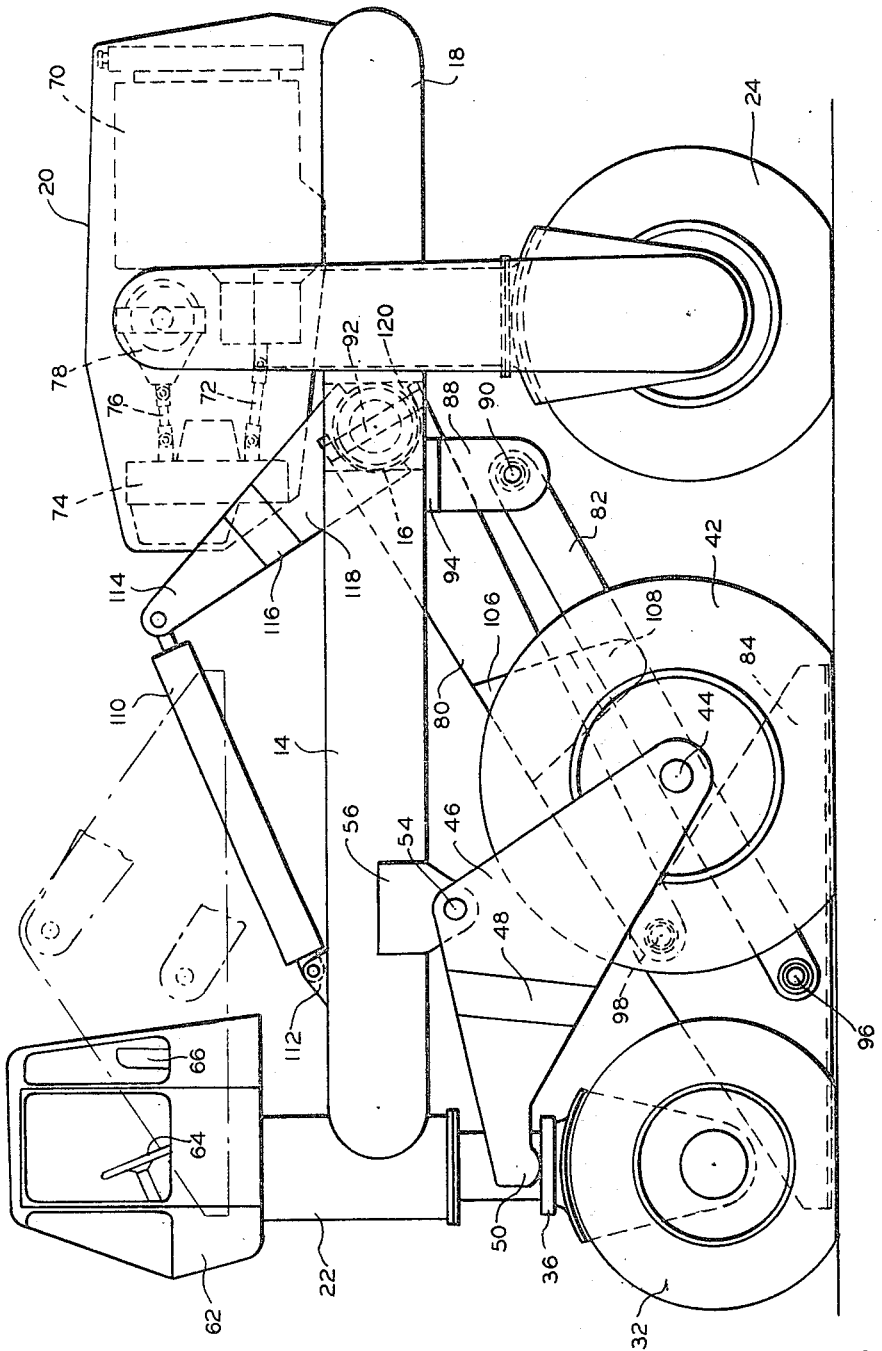

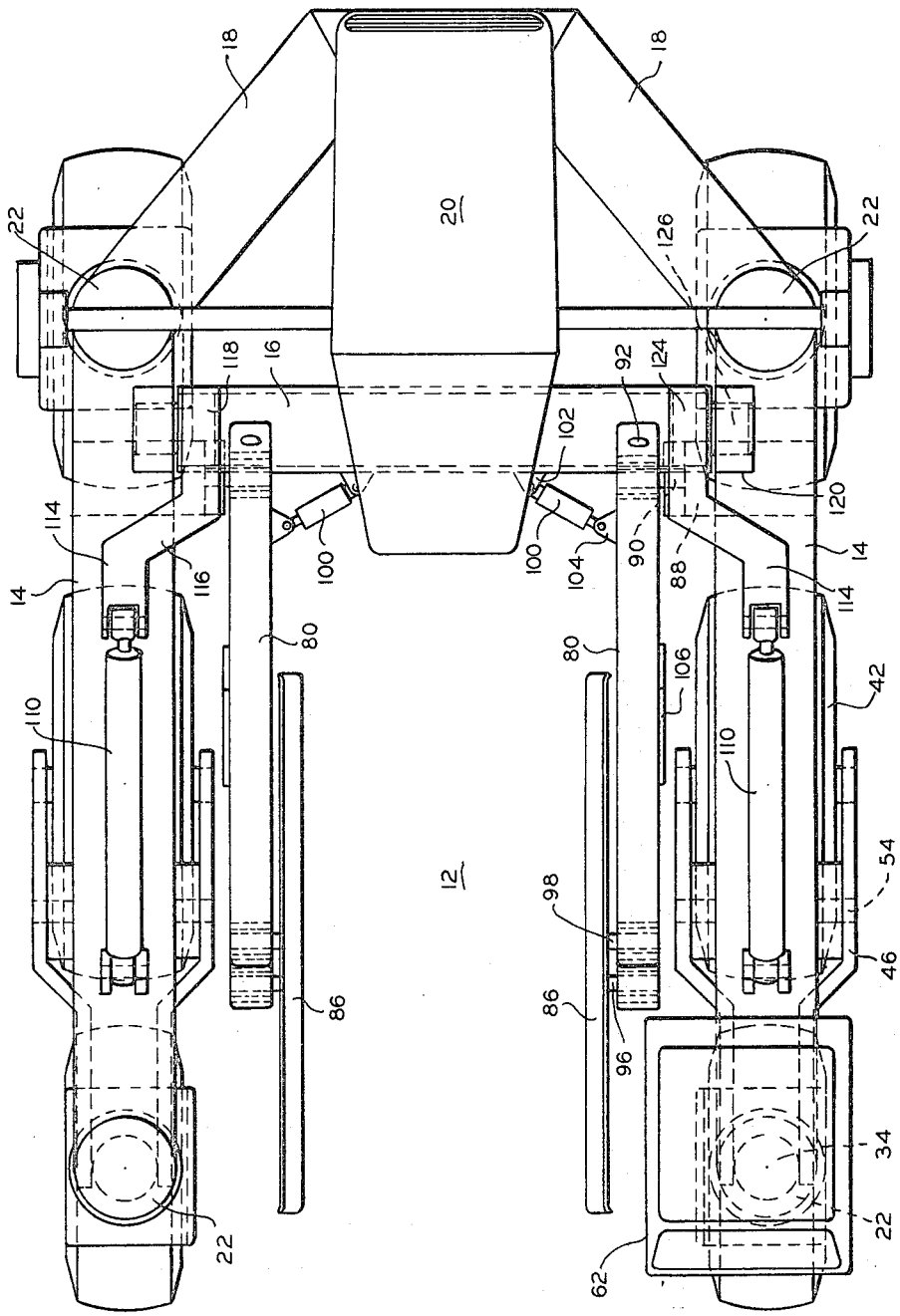

3,387,726
HIGH LIFT STRADDLE CARRIER
Dale W. McKee and William A. Williamson, Battle Creek, Mich., assignors to Clark Equipment Company, a corporation of Michigan
Filed Dec. 22, 1965, Ser. No. 515,581
9 Claims. (Cl. 214—390)

ABSTRACT OF THE DISCLOSURE

A self-propelled straddle carrier machine for handling large containers having a forwardly opening, vertically unobstructed U-shaped chassis with three wheels supporting each side of the chassis, a load proportioning bogie connection between the front and center wheels, longitudinally extending cantilever load hooks supported from the closed end of the chassis for engaging and elevating containers within the vertical bay thereof, and actuating means at each side of the chassis for elevating the load hooks.

---

This invention relates to a straddle carrier type of material handling vehicle, and more particularly to such a vehicle having a vertically and forwardly open bay in which large vans, containers, and the like can be engaged, transported, and elevated to a substantial height.

With the advent of large van and container handling system concepts, sometimes referred to as "containerization" in the industry, came the need for specialized vehicles adapted to efficiently handle and transport van size containers between major freight transport facilities such as railroads, overland trucks, cargo airplanes, and marine freighters. Exemplary of important inventions relating to such system concepts appear in U.S. Patents 3,014,604 and 3,146,903.

The present invention concerns improvements in such a specialized vehicle for use in containerization and other material handling systems which is capable of straddling a van size container, engaging the container by clamp arms, and raising the container to a relatively high elevation by novel lifting mechanism preferably located longitudinally of the vehicle at each side thereof. Preferably, the operator is located at one front corner of the vehicle in order to provide him maximum visibility and good control position. A pair of centrally located wheels are connected by bogies to the front wheels to equalize tire loading under variable load distribution and to maximize load carrying capacity with minimum vehicular width.

Accordingly, it is an object of the invention to provide a generally improved material handling vehicle for use in transporting large van containers and the like.

Another object of the invention is to provide in straddle-type vehicles improved means for actuating vertically a large load to a substantial elevation so that one such load may be stacked atop another such load to form a double tier.

A further object of the invention is to provide a generally U-shaped motorized straddle carrier of the type providing a longitudinally and vertically open unobstructed bay having load engaging mechanism operable within said bay for engaging and lifting loads to a substantial height within the bay, with prime mover means located at one end of the carrier and an operator's station located at the opposite end thereof.

Another object of the invention is to provide a six-wheel straddle carrier of the type contemplated in which the center pair of wheels is connected by bogie means to one of the other pairs of wheels in order to maximize load carrying capacity of the carrier with a carrier of relatively small width.

Other objects and advantages of the present invention will become apparent from the following detailed description of an exemplary embodiment thereof taken in conjunction with the drawings wherein:

FIGURE 1 is a view in perspective of the vehicle of the present invention wherein the load lifting mechanism is shown in a raised position and in engagement with a van-size container;

FIGURE 2 is a view of the vehicle in side elevation; and

FIGURE 3 is a plan view of the vehicle as shown in FIG. 2.

Referring now in detail to the drawings, a straddle carrier is illustrated generally at numeral 10 having a bay 12 open both longitudinally and vertically within a generally U-shaped framework which comprises preferably a pair of laterally spaced hollow tubular structural members 14 connected together adjacent the rear end by a hollow pivotable torque tube 16 and by a rearwardly and transversely extending hollow tubular structure 18 from the rear end of which is cantilevered a forwardly extending power train housing 20 supported from the central portion of structure 18. Vertical tubular post members 22 are located at each of the rectangularly related corners of the machine and are integrated, as by welding, with longitudinal members 14 and with the diagonally extending members 18 of the rearward support structure. Each of a pair of rear wheels 24 is mounted in known manner by a single offset bracket and axle assembly 26 which is secured to and extends outwardly and downwardly from each said post 22. An endless chain drive mechanism is operable within a cover housing 28 in known manner to drive each of rear wheels 24 from a differential drive shaft 30, each drive chain engaging a toothed drive sprocket located at each end of drive shaft 30 and a toothed driven sprocket on the shaft of each wheel 24. A pair of front wheels 32 are also mounted in known manner from forward corner posts 22 by means of spring actuated posts 34 received telescopically within forward posts 22 and spring urged outwardly of posts 22 so that under load the wheel support posts 34 retract within corner posts 22 as a function of the loading of wheels 32. A collar 36 is secured, as by welding, to each post 34 and to inwardly and downwardly extending wheel bracket 38 to which each dirigible wheel 32 is mounted by an axle 40. If desired, rear wheels 24 may also be dirigible so that either two- or four-wheel steering may be utilized. No steering system is disclosed herein since it forms no part of the present invention.

A pair of relatively large non-driven center wheels 42 are mounted on axles 44 from a pair of longitudinally extending, transversely spaced and generally triangular shaped bracket assemblies 46, offset inwardly at 48 to accommodate the difference in width of wheels 32 and 42, and having ends 50 engaging the upper sides of collars 36, each bracket assembly 46 being cross braced at 52 and pivotably supported by a pivot shaft 54 which is supported from a pair of transversely spaced brackets 56 secured to opposite sides of each longitudinal member 14. The assembly of wheels 42 and brackets 46 mounted as shown and impositively connected to wheels 32, each comprises a bogie assembly whereby vertical movement of front wheels 32 under variable load conditions imposes variable proportional loading of center wheels 42 through the functionally bell crank type bracket assemblies 46. The construction and mounting of bogie wheels 42 first tends to equalize the loading of smaller wheels 32 under conditions in which a load 60 is unequally distributed in a direction either transverse or longitudinal of the vehicle; it also minimizes the effect of shock loading on wheels 32 as is encountered when traveling on a rough surface, and permits the design of a minimum width vehicle of particular load carrying capacity by distributing the total load in six areas in order to minimize the size of wheels and tires 32. Since van type containers are often stacked in rows, it is important in order to efficiently utilize space that the open space between the rows be minimized. A relatively narrow width vehicle of the type herein described permits such space efficiency.

An operator's station is preferably located at one front corner of the vehicle to maximize visibility and control of the vehicle in the handling of loads. As illustrated, an operator's cab 62 is located atop the one forward post member 22, and is intended to house all the necessary instrumentation and control means for operating the prime mover, drive train and the load handling mechanism to be described. A steering wheel 64 and an operator's seat 66 are shown in cab 62.

A primer mover and drive train are shown located in housing 20 in FIG. 2. An engine 70 is connected by a drive shaft 72 to a transmission assembly 74 which is connected by a propeller shaft 76 to a differential drive assembly 78 connected to opposite ones of rear wheels 24 by shaft 30 as described above. It will be noted that the drive train is so arranged on opposite sides of the differential assembly 78 that the center of gravity thereof tends to be located near the vertical centerline of the differential assembly, which minimizes off-center loading of the drive train with respect to rear wheels 24.

The load handling mechanism is located within open bay 12 and comprises a parallelogram lift linkage assembly extending longitudinally of the bay adjacent the inner side of each longitudinal member 14. Each linkage assembly comprises upper and lower vertically aligned link members 80 and 82 a generally triangularly shaped load hook 84 pivotably mounted from the forward ends of each link 80 and 82 and having an inwardly extending ledge 86 extending longitudinally of the lower end of the load hook 84, an angle bracket 88 having pivot means 90 mounted at the lower end thereof for supporting the rearward end of link 82, and a pivot shaft 92 extending transversely of torque tube 16 at an angle as best shown in FIG. 2, on the opposite ends of which are pivotally mounted the rear bifurcated end of link 80. Each bracket 88 has an upper inwardly extending horizontal leg 94 secured to the lower side of the respective longitudinal member 14, and a vertical leg extending downwardly from the inner end thereof to which pivot member 90 is secured, the location of connection of link 82 to pivot means 90 being below and forwardly of the horizontal axis of torque tube 16. The effective length of each link 80 is substantially equal to the length of each link 82, so that the pivot connection 96 of link 82 to load hook 84 is located below and forwardly of pivot connection 98 of link 80 to the load hook a distance which is substantially equal to the similar relationship of the axis of torque tube 16 and the connection of link 82 to pivot means 90. Thus, a parallelogram linkage is effected so that when links 80 and 82 are actuated to elevate load hooks 84 in a manner to be described, the load hooks will be maintained with ledges 86 thereof in a substantially horizontal plane throughout the range of lift.

Each of pivot means 90, 96 and 98 is a self-aligning or spherical bushing assembly which permits pivotal movement in more than one direction of the member connected thereto. Exemplary of one type of spherical bushing construction which may be used is "Industrial Bushing part No. B–56–L," manufactured by the Roller Bearing Company of America.

A pair of hydraulic cylinders 100 are mounted diagonally of the corner sections formed between torque tube 16 and each upper link 80. The base end of each cylinder 100 is pivotally connected to a bracket 102 on the torque tube and the piston rod end is pivotally connected to a bracket 104 on the link member. Pump, control valve and conduit means, not shown, are utilized to actuate the pistons of cylinders 100 from the fully retracted positions shown in FIG. 3 in extension so as to actuate the parallelogram linkage assemblies and load hooks a relatively small distance outwardly in opposite directions, whereby to facilitate the engagment of the lower longitudinal corner sections of a load 60 when the carrier vehicle straddles the load. Retraction of cylinders 100 to the positions shown causes ledges 86 to be inserted beneath the container, or any bolster on which it may be mounted, and exert a lateral clamping force on opposite sides of the container for subsequent load handling operations. Preferably, a downwardly depending stop plate member 106 is secured to each upper arm 80 and extends downwardly across the outer side of each link member 82 to provide a stop member which limits movement of link members 82 transversely outwardly of the vehicle when cylinders 100 are actuated to clamp a load between load hooks 84. Link arms 82 tend to move outwardly under such conditions since both ends thereof are supported by spherical bushings. A recess 108 in stop plate 106 normally provides clearance between arm 82 and plate 106.

The lifting mechanism for actuating the parallelogram linkages and load hooks from the ground level position of FIG. 2 to the elevated position of FIG. 1 (also see the broken line position thereof in FIG. 2) comprises a pair of hydraulic lift cylinders 110 pivotally mounted on brackets 112 to extend longitudinally rearwardly of the vehicle in the vertical planes of structural members 14. As shown, each piston rod end of the lift cylinders is pivotally connected to the bifurcated upper end of a lever arm 114. Each arm 114 is offset inwardly at 116 and includes an extension 118 having a semi-circular bearing surface which is connected, as by welding, at the end thereof to the complementary cylindrical surface of torque tube 16. Extension of actuator cylinders 110 from the position illustrated in FIGS. 2 and 3 to the position illustrated in FIG. 1 causes torque tube 16 to rotate in a clockwise direction, as viewed in FIG. 2, which actuates the parallelogram linkage and load hook assembly upwardly within bay 12 to a relatively high elevation when the actuator cylinders are fully extended, while maintaining the ledges 86 of load hooks 84 horizontal whether or not a load is engaged thereby, and whether or not the distribution of the load is uniform or centered with respect to load hooks 84.

Torque tube 16 is mounted for rotation in the rear portions of structural members 14 and forwardly of rearward vertical post 22 by means of a solid bushing or bearing block 120 which is secured inside the tube of each longitudinal member 14 as by welding. A solid cylindrical block member 124 is secured in each end of the torque tube and has a smaller diameter journal 126 secured thereto and extending outwardly thereof for pivotal support in bushing 120. Torque tube 16 functions, therefore, as a pivotable tubular member which also affords structural support in a direction inwardly of the opposite longitudinal members 14, and which tends to equalize the load on actuator cylinders 110 in the event that one of said cylinders tends to advance or retract ahead of the other since a larger load on one of the cylinders is transmitted through the torque tube and imposed on the more lightly loaded cylinder, in known manner.

In operation, the carrier vehicle is capable of engaging van containers endwise from the forward end of the vehicle with excellent operator visibility, clamping the container and lifting the same either for transport or tiering to an elevation sufficient to stack one container atop another in successive laterally spaced rows having relatively little space therebetween. The construction enables, for example, the vehicle to straddle the lower tier with an engaged container in elevated position for stacking same while the longitudinal side portions of the vehicle are inserted in the open spaces between rows of containers. Also, the carrier vehicle is capable of handling long loads in the usual manner of straddle carriers of inverted U-shaped configuration. That is, the present carrier design can readily carry loads which extend lengthwise beyond both the front and rear ends of the vehicle, such as long pipes and the like, on bolsters engaged by the load hooks. In addition, very tall containers or other loads can be carried by load hooks 84 without requiring alteration in the height of the vehicle design, since there is no overhead interference.

It will be understood by persons skilled in the art that the single embodiment disclosed herein is representative of but a single construction and arrangement of parts within the scope of the invention. Various equivalent components and elements of the structure may be readily substituted for those of the exemplary embodiment enclosed, including rearrangements and modifications which will appear to persons skilled in the art, without necessarily departing from the scope of the invention, as defined in the claims appended.

We claim:

1. A wheeled vehicle comprising a horizontally extending U-shaped frame forming an open bay forwardly and vertically for embracing and engaging in said bay a load to be transported by the vehicle, vehicle drive means mounted on the frame and in driving relation with certain wheels of the vehicle, an operator's station and control means mounted on the frame at an elevated position above the vehicle wheels, load engaging means extending longitudinally of opposite side portion of the open bay for engaging a load embraced by the vehicle, longitudinally extending linkage means pivotally connected at one end to each load engaging means, rotatable support means connected to the other end of said linkage means and rotatably supported from opposite side portions of the U-shaped frame adjacent the closed end thereof, and means for rotating said support means to elevate said linkage means and load engaging means a substantial distance vertically in said open bay.

2. A motorized wheeled vehicle comprising a horizontally extending U-shaped frame supported above the vehicle wheels and forming an open unobstructed vertically and forwardly opening pocket for embracing a load to be transported by the vehicle, vehicle drive means mounted on said U-shaped frame and operatively connected to certain wheels thereof, a pair of transversely spaced and longitudinally extending load engaging means in said pocket, longitudinally extending parallelogram linkage means connected to each load engaging means for elevating the latter in a substantially horizontal attitude in the open bay, a transverse member located adjacent one end of the vehicle to which the load engaging means are cantilever connected by said linkage means, longitudinally extending motor means mounted on each longitudinally extending leg of U-shaped frame for actuating said transverse member to elevate said load engaging means and linkage means, and said latter actuating means and linkage means forming with said transverse member bell crank means.

3. A vehicle as claimed in claim 1 wherein said vehicle drive means comprises a prime mover and drive train means mounted adjacent the closed rear end of the vehicle at a position substantially elevated above the vehicle wheels, and said operator's station and control means is mounted on the frame at one side of the vehicle and adjacent the front end thereof.

4. A vehicle as claimed in claim 2 wherein actuating means is operatively connected between said transverse member and said linkage means for actuating said load engaging means and linkage means pivotally in opposite directions transversely of the open pocket for first straddling and then clamping a load therebetween.

5. A vehicle as claimed in claim 1 wherein said linkage means comprises parallelogram linkage means extending forwardly of and cantilevered from said pivotal support means, and said pivotal support actuating means comprising longitudinally extending actuator motor means adjacent each longitudinally extending leg of said U-shaped frame operatively connected to said pivotal support means.

6. A vehicle as claimed in claim 5 wherein bogie means pivotally supports the center wheel of a three-wheel group from each side of the U-shaped frame, said bogie means being operatively connected to one of the other wheels of each three-wheel group so that the load carried by the center wheel varies as a function of the load carried by the wheel to which it is connected.

7. A vehicle as claimed in claim 1 wherein at least three wheels are located in longitudinally spaced relation supporting the frame on each side thereof, bogie means pivotally supporting the center wheel of each said three-wheel group and operatively connected to one of the other wheels so that the load carried by the center wheel varies as a function of the load carried by the wheel to which it is connected, said center wheel being of substantially larger diameter than said other wheel.

8. A wheeled vehicle comprising a horizontally extending U-shaped frame forming an open bay forwardly and vertically for embracing and engaging in said bay a load to be transported by the vehicle, prime mover and drive train means mounted on the vehicle at a substantially elevated position above the vehicle wheels, an operator's station and control means mounted on the vehicle, parallelogram linkage means supported for pivotal movement from the closed end of the vehicle and extending longitudinally forwardly thereof adjacent each side of the vehicle in the open bay thereof, load engaging means pivotally supported from the forward ends of the linkage means, means for actuating said linkage means and load engaging means laterally inwardly and outwardly of the open bay for engaging and clamping a load therebetween, a transversely extending beam pivotally supported from the U-shaped frame adjacent the closed end thereof, said linkage means being pivotally connected to said beam, and longitudinally extending motor actuator means supported from each longitudinally extending leg of the U-shaped frame and operatively connected to said beam for rotating the beam and the linkage means therewith for elevating the load engaging means from a ground engaging position to an elevation in the open bay above the longitudinally extending members of the U-shaped frame.

9. A vehicle as claimed in claim 8 wherein at least three wheels are located in longitudinally spaced relation for supporting the frame on each side thereof, the center wheel of each three-wheel group being pivotally supported from the U-shaped frame, said pivatol support comprising bogie means connected to the center wheel and operatively connected to one of the other wheels of each three-wheel group such that the load carried by the center wheel varies as a function of the load carried by the wheel to which it is connected by said bogie means, said center wheel being of substantially larger diameter than said other wheel.

References Cited

UNITED STATES PATENTS

| 3,039,637 | 6/1962 | Akrep | 214—670 |
| 3,146,903 | 9/1963 | Bjorklund | 214—394 |
| 3,184,089 | 5/1965 | Tourneau | 214—670 |
| 3,223,267 | 12/1965 | Stammen | 214—730 |
| 3,243,061 | 3/1966 | McKeon | 214—390 X |
| 3,300,071 | 1/1967 | Isaacs | 214—390 |
| 3,315,829 | 4/1967 | Cellini | 214—392 |

ALBERT J. MAKAY, *Primary Examiner.*